(12) United States Patent
Lee

(10) Patent No.: US 9,705,699 B2
(45) Date of Patent: Jul. 11, 2017

(54) METHOD AND APPARATUS FOR REDUCING LOAD IN CAN COMMUNICATION

(71) Applicant: HYUNDAI MOTOR COMPANY, Seoul (KR)

(72) Inventor: Young Seop Lee, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 176 days.

(21) Appl. No.: 14/609,313

(22) Filed: Jan. 29, 2015

(65) Prior Publication Data

US 2016/0112215 A1    Apr. 21, 2016

(30) Foreign Application Priority Data

Oct. 17, 2014    (KR) .................. 10-2014-0140622

(51) Int. Cl.
| | |
|---|---|
| *H04L 12/40* | (2006.01) |
| *H04L 12/46* | (2006.01) |
| *H04L 12/403* | (2006.01) |
| *H04L 12/801* | (2013.01) |

(52) U.S. Cl.
CPC ...... *H04L 12/40143* (2013.01); *H04L 12/403* (2013.01); *H04L 12/46* (2013.01); *H04L 12/4625* (2013.01); *H04L 47/12* (2013.01); *H04L 2012/40215* (2013.01)

(58) Field of Classification Search
CPC ............... G06F 13/4221; H04L 12/40; H04L 12/40039; H04L 2012/40273; H04L 47/12; H04L 12/40032
See application file for complete search history.

(56) References Cited

FOREIGN PATENT DOCUMENTS

| | | |
|---|---|---|
| JP | 2013-082352 A | 5/2013 |
| KR | 10-1135101 B1 | 4/2012 |

(Continued)

OTHER PUBLICATIONS

Wu et al., CAN Compression using DLC and Bit Rearrangement, Nov. 2013.*

(Continued)

*Primary Examiner* — Jae Y Lee
*Assistant Examiner* — Aixa Guadalupe-Cruz
(74) *Attorney, Agent, or Firm* — McDermott Will & Emery LLP

(57) ABSTRACT

The present disclosure provides a method and an apparatus for reducing a communication load in controller area network (CAN) communication. A method for reducing communication load in a transmission node connected to a CAN communication network may include: generating a first CAN data frame including first data and transmitting the first CAN data frame to the CAN communication network at a first transmission time; comparing second data with the first data at a second transmission time; and transmitting, to the CAN communication network, a second CAN data frame in which a data length code (DLC) field value is set to a predetermined value indicating that the data has not changed, when the second data is identical to the first data. Accordingly, CAN communication load can be effectively reduced without CAN hardware modification.

14 Claims, 5 Drawing Sheets

(56) References Cited

FOREIGN PATENT DOCUMENTS

KR 10-1191547 B1 10/2012
KR 10-2014-0029431 A 3/2014

OTHER PUBLICATIONS

Korean Office Action dated Feb. 21, 2016 issued in Korean Patent Application No. 10-2014-0140622.
Y. Wu, et al., "Can Data Compression Using Data Length Code (DLC) and Bit Rearrangement," Data Length Code (DLC) Can, 2012, pp. 329-332 (English translation).

* cited by examiner

FIG. 5

| LDWS | | | TPMS | | |
|---|---|---|---|---|---|
| DATA | DATA change interval | Transmission interval | DATA | DATA change interval | Transmission interval |
| System state | Rare (In case of switch operation by driver/failure) | ms | System warning lamp state | Rare (In case of failure) | ms |
| Lane recognition state | Sometimes (Road lane state change) | ms | Low pressure warning lamp state | Rare (In case of air pressure decrease) | ms |
| Lane departure warning command | Sometimes (In case of lane departure during running) | ms | Low pressure position information | Rare (In case of air pressure decrease) | ms |
| Turn signal state | Sometimes (In case of turn signal operation by driver) | ms | Tire pressure by positions | Tens of seconds (Variation according to tire temperature during running) | ms |

FIG. 6

| DLC | 0000 | 0001 | 0010 | 0011 | 0100 | 0101 | 0110 | 0111 | 1000 |
|---|---|---|---|---|---|---|---|---|---|
| Data length | 0byte | 1byte | 2bytes | 3byte | 4bytes | 5bytes | 6bytes | 7bytes | 8bytes |

| DLC | 0000 | 0001 | 0010 | 0011 | 0100 | 0101 | 0110 | 0111 | 1000 |
|---|---|---|---|---|---|---|---|---|---|
| Data length | 0byte (Identical to previous data) | 1byte | 2bytes | 3bytes | 4bytes | 5bytes | 6bytes | 7bytes | 8bytes |

FIG. 8

| Transmission sequence | Message transmitted from transmission node | | | Message processed by reception node | | |
|---|---|---|---|---|---|---|
| | ID | DLC | DATA | ID | DLC | DATA |
| 1 | 580H | 1000 | 3F 00 00 00 FF FF 00 00 | 580H | 1000 | 3F 00 00 00 FF FF 00 00 |
| 2 | 580H | 0000 | ~ | 580H | 1000 | 3F 00 00 00 FF FF 00 00 |
| 3 | 580H | 0000 | ~ | 580H | 1000 | 3F 00 00 00 FF FF 00 00 |
| 4 | 580H | 0000 | ~ | 580H | 1000 | 3F 00 00 00 FF FF 00 00 |
| 5 | 580H | 0000 | ~ | 580H | 1000 | 3F 00 00 00 FF FF 00 00 |
| 6 | 580H | 1000 | 9F FF FF 00 FF FF FF FF | 580H | 1000 | 9F FF FF 00 FF FF FF FF |
| 7 | 580H | 0000 | ~ | 580H | 1000 | 9F FF FF 00 FF FF FF FF |
| 8 | 580H | 0000 | ~ | 580H | 1000 | 9F FF FF 00 FF FF FF FF |
| 9 | 580H | 0000 | ~ | 580H | 1000 | 9F FF FF 00 FF FF FF FF |
| 10 | 580H | 0000 | ~ | 580H | 1000 | 9F FF FF 00 FF FF FF FF |
| ... | | | | | | |

METHOD AND APPARATUS FOR REDUCING LOAD IN CAN COMMUNICATION

This application claims the benefit of Korean Patent Application No. 10-2014-0140622, filed on Oct. 17, 2014, which is hereby incorporated by reference as if fully set forth herein.

BACKGROUND OF THE INVENTION

Field of the Invention

The present disclosure generally relates to controller area network (CAN) communication and, more specifically, to a method for reducing a CAN communication load using a data length code (DLC) included in a CAN data frame in CAN communication and an apparatus therefor.

Discussion of the Related Art

Recent rapid development of information technology (IT) is exerting a great influence on the automobile industry. Various IT technologies are integrated in vehicles.

Particularly, recent automobiles are provided with various radio communication functions and thus various application services are provided.

For example, a road guide device such as a navigation system is a very useful device which determines the current location of a vehicle on the basis of signals received through a global positioning system (GPS) satellite, reads map data corresponding to the measured current location from a map database and displays the map data along with the current location of the vehicle on a display screen such that a driver can recognize a road on which the vehicle currently runs or easily find a destination when driving the vehicle in an area the user does not know.

In addition, a vehicle head unit can be Bluetooth-paired with a user terminal in a vehicle so as to provide a hands-free call service and a multimedia playback service.

In particular, recent automobiles are mostly equipped with various vehicle safety systems and driver convenience systems and thus the quantity of data transmitted and received through a communication network in the automobiles rapidly increases.

Accordingly, a gateway is applied to medium and large sized vehicles to distribute communication loads and a communication method at a higher speed than CAN-FD, Ethernet and the like is under development in order to handle increasing communication loads.

Although application of the gateway and introduction of the high-speed communication method are effective to reduce communication loads, the number of gateway channels is increased and application of a fast communication scheme increases costs. Furthermore, when a fast communication scheme is applied through a communication network built in a vehicle, there are many restrictions on wiring design.

SUMMARY OF THE INVENTION

An object of the present invention devised to solve the problem lies in a method and an apparatus for reducing a load in CAN communication.

Another object of the present invention is to provide a method for reducing a CAN communication load, which is able to decrease a load on a CAN bus while using CAN communication.

Another object of the present invention is to provide a method for reducing a CAN communication load by changing software without hardware modification.

The technical problems solved by the present invention are not limited to the above technical problems and those skilled in the art may understand other technical problems from the following description.

The present invention provides a method and apparatus for reducing communication load in CAN communication.

In an aspect of the present invention, a method for reducing communication load in a transmission node connected to a controller area network (CAN) communication network includes: generating a first CAN data frame including first data and transmitting the first CAN data frame to the CAN communication network at a first transmission time; comparing second data with the first data at a second transmission time; and transmitting, to the CAN communication network, a second CAN data frame in which a data length code (DLC) field value is set to a predetermined value indicating that the data has not changed, when the second data is identical to the first data.

The second data may not be included in the second CAN data frame.

The first data and the second data may be 8 bytes.

The predetermined value indicating that the data has not changed may be a binary value "0000".

The method may further include: when 1 byte of the second data differs from the corresponding byte of the first data, checking a position of the changed byte; and setting a DLC field value corresponding to the checked position.

Only the changed byte of the second data may be inserted into a data field of the second CAN data frame and transmitted.

The DLC field may be 4 bits and 3 least significant bits (LSBs) from among the 4 bits may be used to indicate the position of the changed byte.

The second CAN data frame including the second data may be transmitted to the CAN communication network when 2 or more bytes of the second data differ from the corresponding bytes of the first data.

The first CAN data frame and the second CAN data frame may be periodically transmitted at predefined intervals.

In another aspect of the present invention, a method for reducing a communication load in a reception node connected to a CAN communication network includes: receiving a first CAN data frame including first data at a first reception time; receiving a second CAN data frame at a second reception time; extracting a DLC field value of the second CAN data frame; and generating second data corresponding to the second CAN data frame on the basis of the extracted DLC value.

The first data and the second data may be 8 bytes.

The DLC field value may be 4 bits, and it may be determined that the first data is identical to the second data when the extracted DLC field value is 0.

When the extracted DLC field value exceeds 8, a position of a changed byte of the first data may be checked using 3 LSBs of the 4 bits of the DLC field value.

When the extracted DLC field value exceeds 8, a data field value of the second CAN data frame may be extracted and inserted into the checked position of the first data to generate the second data.

The first CAN data frame and the second CAN data frame may be periodically received at predefined intervals.

The second CAN data frame may not include data when the extracted DLC field value is 0.

In another aspect of the present invention, there is provided a computer readable recording medium storing a program for executing one of the aforementioned methods for reducing communication load.

In another aspect of the present invention, an apparatus for reducing communication load in a transmission node connected to a CAN communication network includes: a means for generating a first CAN data frame including first data and transmitting the first CAN data frame to the CAN communication network at a first transmission time; a means for comparing second data with the first data at a second transmission time; and a means for transmitting, to the CAN communication network, a second CAN data frame in which a DLC field value is set to a predetermined value indicating that the data has not changed, when the second data is identical to the first data.

In another aspect of the present invention, an apparatus for reducing a communication load in a reception node connected to a CAN communication network includes: a means for receiving a first CAN data frame including first data at a first reception time; a means for receiving a second CAN data frame at a second reception time; a means for extracting a DLC field value of the second CAN data frame; and a means for generating second data corresponding to the second CAN data frame on the basis of the extracted DLC value.

The aforementioned aspects of the present invention are merely part of preferred embodiments and various embodiments in which technical features of the present invention are reflected can be derived and understood by a person skilled in the art on the basis of the following detailed description of the invention.

The present invention has the following advantages.

Firstly, the present invention provides a method and an apparatus for reducing a load in CAN communication.

Secondly, the present invention provides a method for reducing a CAN communication load, which can decrease a load on a CAN bus using a DLC field included in a CAN data frame while using a physical layer and a data link layer of the existing CAN communication protocol.

Thirdly, the present invention can decrease costs by reducing a CAN communication load only by changing software without hardware modification.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a table for illustrating relationship between a data change interval and a message transmission interval in a vehicle safety system;

FIG. 6 is a table for illustrating definition of a DLC in a CAN data frame according to International Standard;

FIG. 7 is a table for illustrating definition of the DLC in a CAN data frame according to an embodiment of the present invention;

FIG. 8 is a view illustrating a method for transmitting a CAN data frame according to an embodiment of the present invention.

DETAILED DESCRIPTION OF THE INVENTION

Reference will now be made in detail to the preferred embodiments of the present invention, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present invention are described to be integrated into a single one or to be operated as a single one, the present invention is not necessarily limited to such embodiments. According to embodiments, all of the elements may be selectively integrated into one or more and be operated as one or more within the object and the scope of the present invention. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily reasoned by those skilled in the art to which the present invention pertains. The computer program may be stored in computer readable media such that the computer program is read and executed by a computer to implement embodiments of the present invention. Computer program storage media may include magnetic recording media, optical recording media, and carrier wave media.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not interpreted as ideal or excessively formal meanings.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "accessed to" another element, one element may be "connected to", "coupled to", or "accessed to" another element via a further element although one element may be directly connected to or directly accessed to another element.

Figure 1:
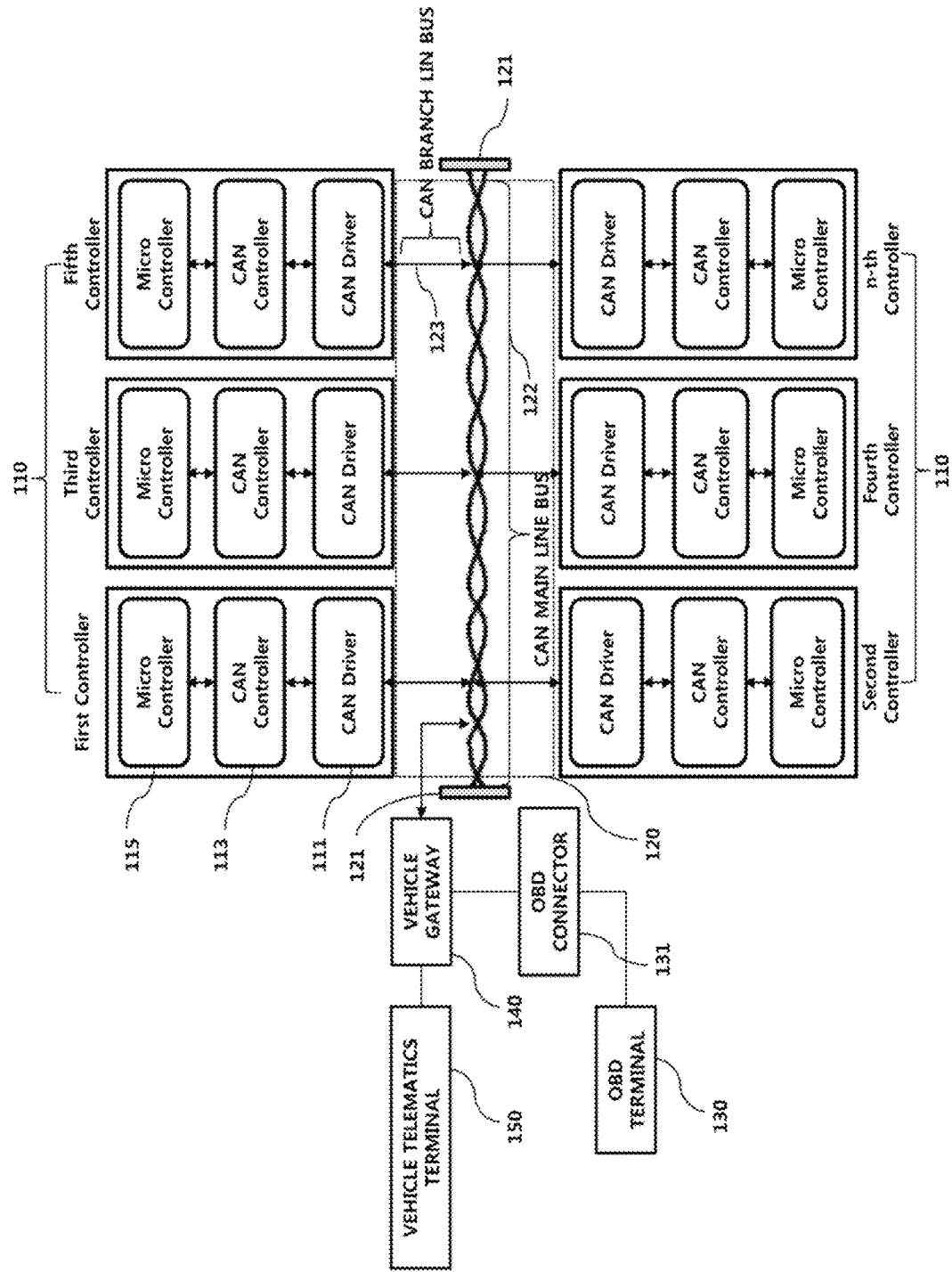
FIG. 1 is a view illustrating a configuration of a vehicle CAN communication network according to an embodiment of the present invention.

FIG. 1 is a view illustrating a configuration of a vehicle CAN communication network according to an embodiment of the present invention.

Referring to FIG. 1, a controller area network (CAN) communication system according to an embodiment of the present invention may include at least one of first to N-th controllers 110, a CAN bus 120, an OBD terminal 130, an OBD connector 131, a vehicle gateway 140 and a vehicle telematics terminal 150.

In general, a master, which controls all nodes (ECUs) when the nodes access data transmitted on a CAN bus to read or write the data, is not present on the CAN bus. Accordingly, when each node is ready to transmit data, whether transmission is ready on the CAN bus is checked and then a CAN frame is transmitted over a CAN. The transmitted CAN frame does not include address information about a transmission node and a reception node, and each node classifies the CAN frame through an ID included in the CAN frame and receives data.

The vehicle gateway 140 may determine whether a corresponding controller is safe through authentication of controllers 110 connected to the CAN. In addition, the vehicle gateway 140 may be connected to the vehicle telematics terminal 150 and the OBD terminal 130 in a wired or wireless manner. For example, a user can connect the OBD terminal 130 to the OBD connector 131 and then confirm state information on the controllers 110 connected to a CAN main line bus 122 through a screen on the OBD terminal 130 or monitor control signals transmitted and received through the CAN main line bus 122. In addition, the user can check vehicle state information collected by the controllers 110 through the OBD terminal 130. Here, the state information of the controllers 110, control signals on the CAN main line bus 122 and the vehicle state information collected by the controllers 110 may be transmitted to the OBD terminal 130 through the vehicle gateway 140.

Alternatively, the OBD connector 131 may be directly connected to the CAN main line bus 122. In this case, the OBD terminal 130 may directly monitor signals transmitted and received on the CAN main line bus 122 or acquire controller state information and vehicle state information from the controllers 110 through a predetermined control command, without passing through the vehicle gateway 140.

Furthermore, the gateway 140 may collect information on versions of software installed in controllers, that is, electric control units (ECUs) built in the vehicle, according to a predetermined control signal from the OBD terminal 130 and transmit the collected software version information to the OBD terminal 130. In addition, the gateway 140 may receive a software file for a corresponding controller from the OBD terminal 130 and install the software file in the corresponding controller according to a predetermined software update request signal of the OBD terminal 130.

The CAN main line bus 122 uses twisted pair wires and the two wires are driven by different signals CAN_HI and CAN_LO. A terminating resistor 121 may be provided to each end of the CAN main line bus 122. A transmission speed on the CAN main line bus 122 may depend on the length of the bus, that is, the length of a main line.

The first to N-th controllers 110 may be connected to a predetermined CAN joint connector on the CAN main line bus 122 or to a CAN hub (not shown) through a CAN branch line bus 123. In theory, a maximum number of controllers that can be connected to one network is 2032. A plurality of controllers may be connected to one CAN hub through the CAN branch line bus 123.

A description will be given of a configuration of a controller connected to a general CAN main line bus with reference to numerals 110 to 115 in the figure.

Each controller 110 may include a CAN driver 111, a CAN controller 113 and a microcontroller 115.

The CAN driver 111 is connected to the CAN main line bus 122 through the CAN branch line bus 123 and the CAN connector or a CAN hub (not shown) and constitutes a physical layer of each controller. The CAN driver 111 may provide a function of detecting and managing a fault in the CAN main line bus 122 and a function of transmitting and receiving messages.

The CAN controller 113 transmits and receives a CAN protocol message and filters the received message. In addition, the CAN controller 113 provides a function of interfacing with a message buffer and the microcontroller 115 for retransmission control.

The microcontroller 115 may include a CPU and provide a higher layer protocol and various applications.

The controller 100 may include a predetermined memory (not shown) in which priority information, information on versions of installed software, sensing information and the like are stored.

The controllers 110 connected to the CAN main line bus 122 may transmit control signals and data through a CAN frame defined in the standards.

The structure of the CAN frame will now be described in detail with reference to FIG. 2.

Figure 2:
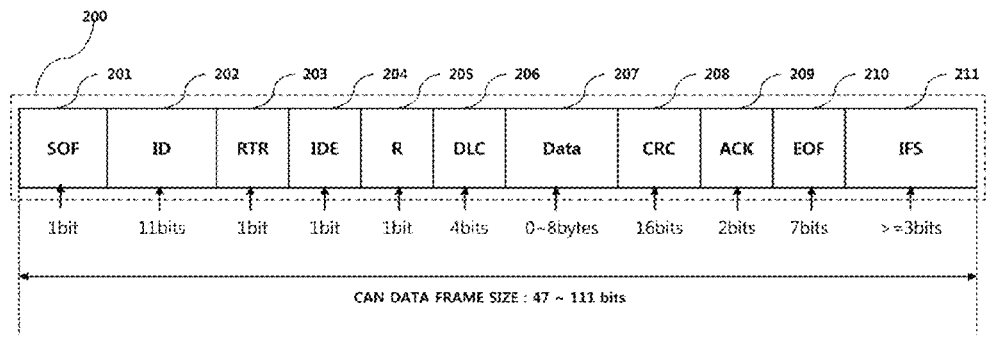
FIG. 2 is a structure of a CAN data frame defined in International Standard.

FIG. 2 illustrates a structure of a CAN data frame 200 defined in International Standard.

Referring to FIG. 2, the CAN data frame 200 may include an SOF (Start Of Frame) field 201, an ID (Identifier) field 202, an RTR (Remote Transmission Request) field 203, an IDE (Identifier Extension) field 204, an R (Reserved) field 205, a DLC (Data Length Code) field 206, a data field 207, a CRC (Cyclic Redundancy Check) field 208, an ACK (Acknowledgement) field 209, an EOF (End Of Frame) field 210 and an IFS (Interframe Space) field 211.

The SOF field 201 has a length of 1 bit and is used to indicate start of the corresponding frame.

The ID field 202 is information that identifies a message type and designates priority of a message. While a standard CAN data frame format with an 11-bit ID field 202 is illustrated in the present embodiment, an extended CAN data frame format with a 29-bit ID 202 is also defined in the standard.

The IDE field 204 has a length of 1 bit and is used to identify whether the corresponding frame is a standard frame or an extended frame. For example, the corresponding frame is a standard frame when the IDE 203 is 0 and an extended frame when the IDE 203 is 1.

The RTR field 203 is used to indicate whether the corresponding frame is a remote frame or a data frame. For example, the corresponding frame is a data frame when the RTR 203 is 0 and a remote frame when the RTR 203 is 1.

The R field 205 is a field reserved for later use which is not defined in the current standard and has a length of 1 bit.

The DLC field 206 is code information for recognizing the length in bytes of data included in the corresponding frame and has a length of 4 bits.

The data field 207 may have a variable length in the range of 0 bytes to 8 bytes.

The CRC field 208 is composed of a 15-bit periodic redundancy check code and a 1-bit retrogressive delimiter and used to check whether the corresponding frame has an error when the frame is received.

The ACK field 209 is used to check whether a receiver has received the corresponding frame normally and has a length of 2 bits. All CAN controllers that have successfully received the CAN data frame transmit an ACK bit positioned at the end of the corresponding frame. A transmission node checks whether the ACK bit is present on the bus and attempts to retransmit the corresponding frame when the ACK bit is not discovered.

The EOF field 210 indicates the end of the corresponding CAN frame and has a length of 7 bits.

The IFS field 211 indicates a time necessary for the CAN controller to process a subsequent frame and may be used to secure a time necessary to move a correctly received frame to an appropriate position in a message buffer region.

As described above, the CAN data frame has a variable length in the range of 47 bits to 111 bits. When the data field 207 is 8 bytes, the proportion of the data field 207 in the CAN data frame corresponds to 58%.

A CAN communication message is provided in various frame formats, such as a data frame, a remote frame, an error frame and the like.

However, the CAN data frame most relevant to the object of the present invention to reduce a CAN communication load will be described in detail.

Figure 3:
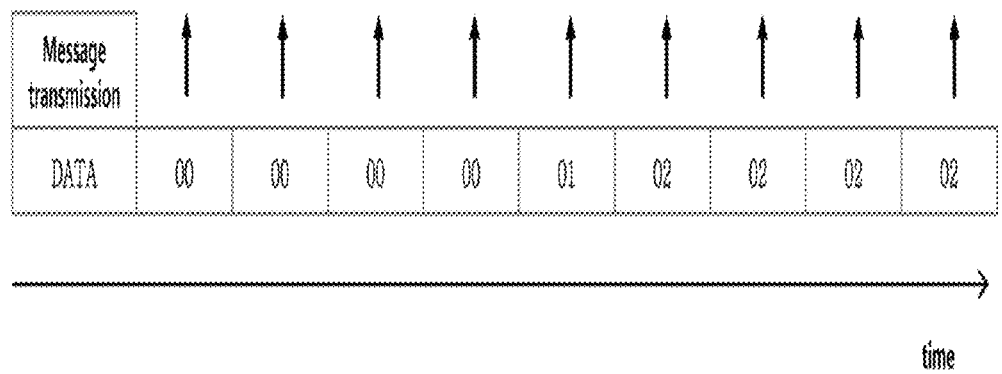
FIGS. 3 and 4 are views illustrating transmission schemes used for CAN communication according to an embodiment of the present invention.
Figure 4:
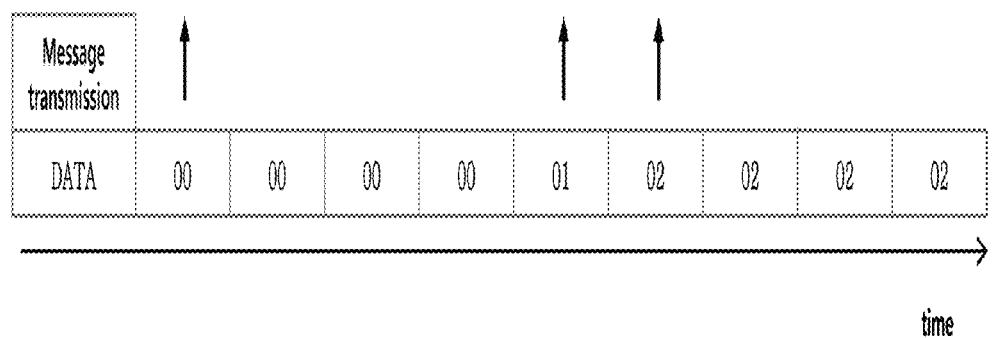

FIGS. 3 and 4 are views illustrating transmission methods used for CAN communication according to an embodiment of the present invention.

Specifically, FIG. 3 illustrates a periodic transmission mode in which a specific transmission node transmits a message at predetermined intervals and FIG. 4 illustrates an event transmission mode in which a message is transmitted only when data to be transmitted is changed.

Referring to FIG. 3, a transmission node periodically generates a message, that is, a CAN data frame at predetermined intervals and transmits the message to the CAN. Here, whether data included in the transmitted message is changed may not be checked in the periodic transmission mode.

Particularly, a periodic CAN data frame transmitted in the periodic transmission mode can be used as a "keepalive frame" for checking whether the transmission node normally operates from the viewpoint of a reception node.

Referring to FIG. 4, in the event transmission mode, the transmission node compares data to be transmitted with previously transmitted data, configures the data to be transmitted as a CAN data frame when the data to be transmitted differs from the previously transmitted data and transmits the CAN data frame through the CAN bus.

CAN communication load can be reduced in the event transmission mode since the same data is not unnecessarily transmitted. However, there is a problem that the reception node cannot recognize whether the CAN data frame is not received because data is not changed or because of a problem with the transmission node.

Due to the aforementioned problem, chassis and power train controllers, which need to secure vehicle performance and safety, are designed to transmit data within a designated time using a periodic message, and it is determined that the transmission node has a problem and a current mode is switched to a fail-safe mode when the reception node does not receive a message for a predetermined time.

Recently, the number of short-period messages has abruptly increased according to increases in the number of vehicle safety related systems, such as a driver supporting system, and the number of functions, leading to an in-vehicle communication load increase.

Power train and chassis systems sensitive to performance and security need to be provided with correct data within a set time, to determine whether a controller transmitting a message is in a normal state within a short period of time, and to take an appropriate measure.

Accordingly, data transmission and reception using the periodic message between the aforementioned periodic message and event message is used.

However, all pieces of information transmitted and received by the power train and chassis systems through CAN communication do not have data varied at short intervals and the information may include information having data which is not changed for a considerably long time. Accordingly, even when data is not changed, a transmission node can periodically transmit a message in terms of fault diagnosis and fail-safety.

For example, in the case of messages which indicate an electronic stability control (ESC) system state and an alarm lamp state, the messages are transmitted with all bits thereof set to '0' in a normal state and data is varied in the messages only when the ESC system has a problem or ESC control is performed. Particularly, in a normal running state of a vehicle, ESC related data might not vary from when the vehicle is started until the vehicle is parked. Here, the ESC system provides a function of sensing an unstable state of a vehicle during acceleration, braking and cornering of the vehicle so as to minimize sliding of the vehicle.

Furthermore, in the case of gear stage information, oil temperature information and brake state information of a transmission control unit (TCU) or a tire pressure state of a Tire Pressure Monitoring System (TPMS), data is varied during running. However, a data change interval is several seconds to several minutes, which is considerably longer than a message transmission interval of tens of ms to hundreds of ms. When a data value is changed, however, the transmission interval cannot be increased since information needs to be transmitted within tens of ms to hundreds of ms.

FIG. 5 is a table for illustrating the relationship between a data change interval and a message transmission interval in a vehicle safety system.

Referring to FIG. 5, in the case of a lane departure warning system (LDWS), lane departure warning command data may be changed when a vehicle departs from a lane during running and may have a transmission interval in unit of ms.

In the case of a TPMS, low pressure warning lamp state data is changed only when the air pressure decreases to lower than a reference value. That is, the low pressure warning lamp state data is seldom generated except when the air pressure is abruptly decreased due to external factors such as flat tire. However, since air pressure decrease is fatal to vehicle safety, corresponding data needs to be generated at short transmission intervals, for example, several ms. Here, the TPMS may be a system which indicates the position of a low-pressure tire along with a warning message through a cluster display upon sensing of the low-pressure tire through an air pressure monitoring sensor attached to each tire.

FIG. 6 is a table for illustrating definition of a DLC in a CAN data frame according to International Standard.

As described above with reference to FIG. 2, the DLC 206 is information for recognizing the length of data included in the CAN data frame 200 and has a length of 4-bit. Since a maximum data length is 8 bytes in the current standard, the DLC 206 is defined in the range of binary numbers "0000" to "1000" and used, as shown in FIG. 6.

For example, a DLC value "0000" indicates that the data 207 is 0 bytes and a DLC value "1000" indicates that the data 207 is 8 bytes.

FIG. 7 is a DLC mapping table 700 for illustrating definition of the DLC in the CAN data frame according to an embodiment of the present invention.

Referring to the DLC mapping table 700, the DLC value 206 of "0000" indicates that data 207 included in the CAN data frame is identical to data 207 of an immediately previously transmitted CAN data frame. Accordingly, the transmission node may set the DLC 206 to "0000", generate a CAN data frame with the data field 207 unfilled and transmit the CAN data frame to the CAN network when data to be currently transmitted is identical to previous data. The reception node may determine that currently received data is identical to previously received data when the DLC 206 of the received CAN data frame is "0000".

That is, the transmission node does not transmit data and transmits the DLC 207 of "0000". This can reduce CAN network load.

FIG. 8 is a view illustrating a method for transmitting a CAN data frame according to an embodiment of the present invention.

Specifically, FIG. 8 illustrates a method for processing a CAN data frame by a transmission node and a reception node according to the DLC definition of an embodiment of the present invention.

Referring to FIG. 8, the transmission node may set a DLC value to "1000" and transmit 8-byte data 0x3F000000FFFF0000 in transmission sequence 1.

The transmission node sets the DLC value to "0000" and transmits data of 0 bytes when the data is not changed in transmission sequence 2. Here, the reception node can determine that currently received data is identical to the previous data 0x3F000000FFFF0000 when the DLC value is "0000".

Upon confirming that the data is changed in transmission sequence 6, the transmission node sets the DLC value to "1000" and transmits changed 8-byte data 0x9FFFFF00FFFFFFFF.

In transmission sequence 7, the transmission node sets the DLC value to "0000" and transmits 0-byte data when data is identical to the data of transmission sequence 6.

Consequently, it is possible to reduce a load corresponding to 8 bytes, that is, to decrease load by 58%, by processing the CAN data frame through the aforementioned control operation, compared to the conventional CAN data frame.

Figure 9:
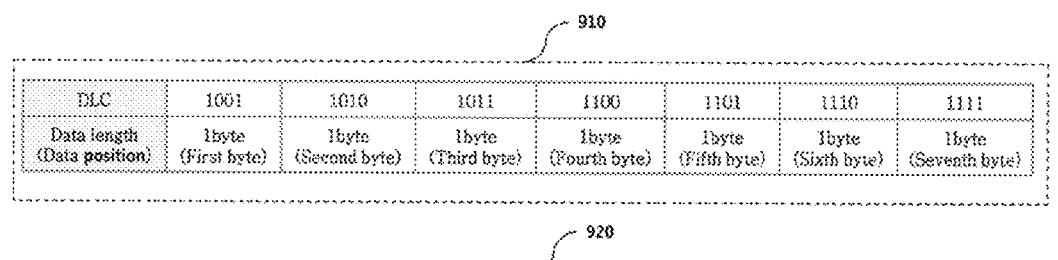
FIG. 9 is a view illustrating a method for reducing load in CAN communication according to an embodiment of the present invention.

FIG. 9 is a view illustrating a method for reducing CAN communication load according to another embodiment of the present invention.

The DLC 207 is defined in the range of "0000" to "1000" and usage of values of "1001" to "1111" is not defined in the above description.

From among periodic messages used for in-vehicle CAN communication, specific 1-byte data included in a CAN data frame may be used as a keepalive counter in order to secure data reliability. Here, the keepalive counter may increase by 1 per transmitted CAN data frame. Accordingly, the reception node can check whether data has been lost by checking whether the keepalive counter uniformly varies per CAN data frame.

In the case of a specific message, only 1 byte of transmitted data may differ from previously transmitted data.

When only 1 byte of 8-byte data is changed, the transmission node according to the present embodiment can determine a DLC value corresponding to the changed byte of the data with reference to a DLC-to-changed data position mapping table 910.

For example, referring to the changed data position mapping table 910, when the third byte of 8-byte data is changed, a DLC value corresponding to the third byte may be "1011". 3 least significant bits (LSBs) of a 4-bit DLC can be used as information for indicating the position of 1 byte of data to be transmitted, which has been changed from the corresponding bit of previously transmitted data. The transmission node may set the DLC value to "1011", include only the changed 1 byte in the data field 207 and transmit the corresponding data.

Accordingly, a lower layer of the reception node, for example, the physical layer or MAC layer can check 3 LSBs of the DLC value to acquire information on the position of a changed byte of received data, change only the byte of previously received data, which corresponds to the changed position, and transmit the data to a higher layer, for example, the application layer, when the DLC value exceeds "1000".

Referring to table 920, the transmission node may transmit 8-byte data 0x2F000000FFFF0000 in transmission sequence 1.

Subsequently, upon confirming that only the first byte of the 8-byte data transmitted in transmission sequence 1 has been changed in transmission 2, the transmission node may set the DLC value 206 to "1001", insert only the changed 1 byte 0x77 into the data field 207 and transmit the corresponding CAN data frame.

The reception node may extract the DLC value 206 from the received CAN data frame and check whether the extracted DLC value 206 exceeds "1000".

When the DLC value 206 exceeds "1000", the reception node may acquire information on the position of the changed byte using 3 LSBs 001 of the DLC value 206. That is, the reception node can confirm that the first byte of previously received data has been changed.

Subsequently, the reception node may extract the changed 1 byte 0x77 from the received CAN data frame and insert the extracted 1 byte 0x77 into the first byte of the 8-byte data received in transmission sequence 1 to obtain data 0x3F000000FFFF0077 in transmission sequence 2.

When 2 or more bytes of data to be currently transmitted differ from previously transmitted data, the transmission node may transmit a CAN data frame including the data to be currently transmitted to the CAN communication network. Here, the DLC value 206 is set to "1000".

As described above, the present invention can reduce the amount of transmitted data by up to 58% compared to a CAN data frame, which is configured using less varied information such as system state information, switch information, warning lamp/alarm control information, a cooperation control command, temperature information, tire pressure information and the like, thereby decreasing communication load and improving in-vehicle communication delay.

It will be appreciated by persons skilled in the art that that the effects that can be achieved through the present invention are not limited to what has been particularly described hereinabove and other advantages of the present invention will be more clearly understood from the above detailed description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reducing communication load in a transmission node connected to a controller area network (CAN) communication network, the method comprising steps of:
   generating a first CAN data frame including first data and transmitting the first CAN data frame to the CAN communication network at a first transmission time;
   comparing second data with the first data at a second transmission time;
   transmitting, to the CAN communication network, a second CAN data frame in which a data length code (DLC) field value is set to a predetermined value indicating that the data has not changed, when the second data is identical to the first data;
   checking a position of a changed byte when 1 byte of the second data differs from the corresponding byte of the first data; and
   setting a DLC field value corresponding to the checked position,
   wherein only the changed byte of the second data is inserted into a data field of the second CAN data frame and transmitted.

2. The method according to claim 1, wherein the second data is not included in the second CAN data frame.

3. The method according to claim 1, wherein the first data and the second data are 8 bytes.

4. The method according to claim 1, wherein the predetermined value indicating that the data has not changed is a binary value "0000".

5. The method according to claim 1, wherein the DLC field is 4 bits and 3 least significant bits (LSBs) from among the 4 bits are used to indicate the position of the changed byte.

6. The method according to claim 1, wherein the second CAN data frame including the second data is transmitted to the CAN communication network when 2 or more bytes of the second data differ from the corresponding bytes of the first data.

7. The method according to claim 1, wherein the first CAN data frame and the second CAN data frame are periodically transmitted at predefined intervals.

8. A method for reducing a communication load in a reception node connected to a controller area network (CAN) communication network, the method comprising steps of:
   receiving a first CAN data frame including first data at a first reception time;
   receiving a second CAN data frame at a second reception time;
   extracting a data length code (DLC) field value of the second CAN data frame; and
   generating second data corresponding to the second CAN data frame on the basis of the extracted DLC value,
   wherein, when the extracted DLC field value exceeds 8, a position of a changed byte of the first data is checked using 3 least significant bits (LSBs) of the 4 bits of the DLC field value and a data field value of the second CAN data frame is extracted and the extracted data field value is inserted into the checked position of the first data to generate the second data.

9. The method according to claim 8, wherein the first data and the second data are 8 bytes.

10. The method according to claim 8, wherein the DLC field value is 4 bits, and it is determined that the first data is identical to the second data when the extracted DLC field value is 0.

11. The method according to claim 8, wherein the first CAN data frame and the second CAN data frame are periodically received at predefined intervals.

12. The method according to claim 8, wherein the second CAN data frame does not include data when the extracted DLC field value is 0.

13. An apparatus for reducing communication load in a controller connected to a controller area network (CAN) communication network, the apparatus comprising:
   a CAN controller configured to generate a first CAN data frame including first data; and
   a CAN driver configured to transmit the first CAN data frame to the CAN communication network at a first transmission time,
   wherein the CAN controller compares a second data with the first data at a second transmission time, checks a position of a changed byte when 1 byte of the second data differs from the corresponding byte of the first data, and sets a data length code (DLC) field value corresponding to the checked position, and
   wherein only the changed byte of the second data is inserted into a data field of the second CAN data frame.

14. An apparatus for reducing a communication load in a controller connected to a controller area network (CAN) communication network, the apparatus comprising:
   a CAN driver configured to receive a first CAN data frame including first data at a first reception time and a second CAN data frame at a second reception time through the CAN communication network; and
   a CAN controller configured to extract a data length code (DLC) field value of the second CAN data frame and generate a second data corresponding to the second CAN data frame on the basis of the extracted DLC value,
   wherein when the extracted DLC field value exceeds 8, a position of a changed byte of the first data is checked using 3 least significant bits (LSBs) of the 4 bits of the DLC field value and a data field value of the second CAN data frame is extracted and the extracted data field value is inserted into the checked position of the first data to generate the second data.

* * * * *